United States Patent [19]

Smith

[11] Patent Number: 4,813,834

[45] Date of Patent: Mar. 21, 1989

[54] FIT-UP FASTENER WITH FLEXIBLE TAB-LIKE RETAINING STRUCTURE AND METHOD OF MAKING SAME

[75] Inventor: Walter J. Smith, Waco, Tex.

[73] Assignee: Huck Manufacturing Company, Irvine, Calif.

[21] Appl. No.: 188,747

[22] Filed: Apr. 29, 1988

Related U.S. Application Data

[63] Continuation of Ser. No. 761,375, Aug. 1, 1985, abandoned.

[51] Int. Cl.⁴ ............................................. F16B 19/05
[52] U.S. Cl. .................................... 411/337; 411/361; 411/512
[58] Field of Search ............... 411/301, 302, 303, 304, 411/352, 353, 337, 360, 361, 362, 43, 70, 512, 411, 378

[56] References Cited

U.S. PATENT DOCUMENTS

| | | |
|---|---|---|
| 612,316 | 10/1898 | Downes . |
| 1,229,560 | 6/1917 | Whiteman . |
| 2,397,076 | 3/1946 | Keller et al. . |
| 2,510,076 | 6/1950 | Cockrell . |
| 2,531,048 | 11/1950 | Huck . |
| 2,531,049 | 11/1950 | Huck . |
| 2,669,469 | 2/1954 | Finch . |
| 2,764,045 | 9/1956 | Koenig . |
| 2,764,046 | 9/1956 | Heinrich . |
| 2,894,425 | 7/1959 | Rapata ............................. 411/352 X |
| 2,955,505 | 10/1960 | Schuster . |
| 2,972,274 | 2/1961 | La Bombard et al. . |
| 3,078,002 | 2/1963 | Rodgers, Jr. . |
| 3,094,017 | 6/1963 | Champoux et al. . |
| 3,136,204 | 6/1964 | Reynolds . |
| 3,139,786 | 7/1964 | Ardell . |
| 3,203,300 | 8/1965 | Marschner . |
| 3,241,421 | 3/1966 | Siebol . |
| 3,295,404 | 1/1967 | Baker ................................. 411/361 |
| 3,367,228 | 2/1968 | King . |
| 3,371,572 | 3/1968 | King ................................. 411/361 |
| 3,394,626 | 7/1968 | Oliver . |
| 3,412,639 | 11/1968 | Sauter . |
| 3,421,562 | 1/1969 | Orloff et al. . |
| 3,425,259 | 2/1969 | Baugh . |
| 3,464,472 | 9/1969 | Reynolds . |
| 3,512,448 | 5/1970 | Summerlin et al. . |
| 3,560,124 | 2/1971 | Bergere . |
| 3,779,127 | 12/1973 | Speakman . |
| 3,796,125 | 3/1974 | Campbell et al. . |
| 3,915,052 | 10/1975 | Ruhl . |
| 3,915,053 | 10/1975 | Ruhl . |
| 3,988,959 | 11/1976 | Buchanan . |
| 3,999,339 | 12/1976 | Sappenfield . |
| 4,012,828 | 3/1977 | Dahl . |
| 4,028,988 | 6/1977 | Schafers . |
| 4,050,346 | 9/1977 | Fischer . |
| 4,069,575 | 1/1978 | Sigmund . |
| 4,084,829 | 4/1978 | Faichle et al. . |
| 4,136,596 | 1/1979 | Davis . |
| 4,137,816 | 2/1979 | Gartner . |
| 4,197,782 | 4/1980 | Champoux . |
| 4,198,895 | 4/1980 | Ruhl . |
| 4,254,809 | 3/1981 | Schuster . |
| 4,260,005 | 4/1981 | Stencel . |
| 4,309,138 | 1/1982 | Jarman et al. . |
| 4,314,784 | 2/1982 | Tausig . |
| 4,324,518 | 4/1982 | Dixon . |
| 4,339,217 | 7/1982 | Lacey . |
| 4,342,529 | 8/1982 | Smith ................................. 411/361 |
| 4,408,936 | 10/1983 | Williamson . |
| 4,435,111 | 3/1984 | Mizusawa ....................... 411/512 X |
| 4,437,805 | 3/1984 | Smith ............................... 411/43 X |
| 4,472,096 | 9/1984 | Ruhl et al. . |
| 4,519,735 | 5/1985 | Machtle . |

FOREIGN PATENT DOCUMENTS

| | | |
|---|---|---|
| 157520 | 7/1954 | Australia ........................... 411/337 |
| 59825 | 9/1982 | European Pat. Off. . |

(List continued on next page.)

*Primary Examiner*—Richard E. Moore
*Assistant Examiner*—Rodney M. Lindsey
*Attorney, Agent, or Firm*—Harness, Dickey & Pierce

[57] ABSTRACT

A fastening system including a two piece swage type fastener including a pin and a collar adapted to be swaged into circumferentially extending lock grooves in the pin and with the collar having a radially inwardly extending flexible tab located at one end and being engageable with the lock grooves for pre-assembling the work pieces to be secured prior to swage.

19 Claims, 2 Drawing Sheets

FOREIGN PATENT DOCUMENTS

| | | |
|---|---|---|
| 2151847 | 4/1972 | Fed. Rep. of Germany . |
| 2613499 | 10/1977 | Fed. Rep. of Germany . |
| 2744666 | 4/1979 | Fed. Rep. of Germany . |
| 3022414 | 1/1982 | Fed. Rep. of Germany . |
| 3031048 | 3/1982 | Fed. Rep. of Germany . |
| 3341266 | 5/1985 | Fed. Rep. of Germany . |
| 1546527 | 10/1968 | France . |
| 2167419 | 7/1973 | France . |
| 22402 | 12/1961 | German Democratic Rep. . |
| 358991 | 1/1962 | Switzerland . |
| 483571 | 2/1970 | Switzerland . |
| 232671 | 4/1969 | U.S.S.R. ............................ 411/337 |
| 566907 | 1/1945 | United Kingdom . |
| 1023780 | 3/1966 | United Kingdom . |
| 2028949 | 3/1980 | United Kingdom ................ 411/304 |
| 2083586 | 3/1982 | United Kingdom . |

FIT-UP FASTENER WITH FLEXIBLE TAB-LIKE RETAINING STRUCTURE AND METHOD OF MAKING SAME

This is a continuation of United States patent application No. 761,375, filed Aug. 1, 1985 now abandoned.

SUMMARY BACKGROUND OF THE INVENTION

The present invention relates to multiple-piece swage type fasteners including a pin and a collar and more particularly to such fasteners having a flexible connection between the pin and collar to facilitate pre-assembly of the fastener components with the workpieces to be secured together.

The present invention generally relates to two-piece swage type fasteners or lockbolts of the types illustrated in U.S. Pat. No. 3,915,053 to J. Ruhl, issued Oct. 28, 1975, U.S. Pat. No. 2,531,048 to L. Huck, issued Nov. 21, 1950, U.S. Pat. No. 4,472,096 to J. Ruhl and R. Dixon, issued on Sept. 18, 1984, U.S. Pat. No. 4,342,529 to W. J. Smith issued on Aug. 3, 1982, and U.S. Pat. No. 3,295,404 to D. M. Baker, issued on Jan. 3, 1967. All of the above patents can be considered as prior art relative to the present invention.

The fastener of the present invention, as with the prior art noted, includes a pin and a collar adapted to be swaged into lock grooves in the pin in response to a preselected relative axial force applied between the pin and collar.

In many commercial applications, two-piece threaded fasteners are used and are installed in two or more steps. Thus it is common to secure a structure first by attaching the associated members with the fasteners loosely engaged. This facilitates adjustment and/or alignment of the structural members to a final, desired orientation. Next the fasteners are tightened to a preselected final torque. A traditional problem with torque applied threaded fasteners is that the final clamp load attained is generally unpredictable due to frictional and other factors i.e. friction between nut and engaged workpiece surface, friction in the engaging threads, etc. Two-piece swage type fasteners, however, are not confronted with such frictional problems and hence can provide more uniformly predictable clamp loads. However, the swage type fasteners have not been capable of providing the initial assembly or fit up available with threaded fasteners and still provide a final clamp with only a second, final installation step. Prior threaded swage and/or crimp type fasteners would require extra steps or complex tooling. For example, a threaded crimp type fastener would not provide the same flexibility without complex installation tools; see for example the U.S. Pat. No. 3,421,562 to J. F. Orloff et al issued Jan. 14, 1969. While the latter fastener would permit an initial assembly similar to a conventional threaded fastener, the final installation would require either separate additional steps of final torquing and crimping or a complex tool capable of performing the latter steps in sequence.

In the present invention the lock grooves of the pin can be in the form of annular grooves or a helical male thread. The collar is provided with a flexible tab-like construction of a preselected circumferential extent such that an initial assembly and limited clamp can be accommodated. In addition the flexible tab-like structure is shaped such as to provide for ease of assembly of the collar onto the pin while providing a higher resistance to disassembly. At the same time, the tab permits disassembly, prior to final installation, in those applications where this may be desired. The tab structure is constructed such that, in response to the relative axial force applied to set the fastener and at a level prior to the initiation of collar swage into the pin lock grooves between the pin lock ridges, it will deform whereby the collar will be free to move axially over the pin and to respond to the installation loads in the same manner as a collar without such a tab structure. In addition the flexible tab is purposely located at either extremity of the collar where its effect on lock groove fill via the swaged collar will be minimal and hence the tab structure, while inhibiting the collar from moving off the pin prior to swage, will not appreciably affect the strength of the installed fastener. Thus the fastener permits the workpieces to be pre-assembled and finally secured together with the desirable high clamp loads available with swage type fasteners.

While the noted patent to Baker, supra, shows the use of a retaining ring to hold a pin and collar together, it does not teach the tab-like structure having features as noted above; in addition the present invention provides a unique and simple means of constructing the tab-like structure and collar combination.

While in one form of the invention the final installation of the fastener can be accomplished with a conventional pull tool, in another form a stump type version of the fastener could be utilized with the final installation effectuated by a squeeze type tool.

Thus it is an object of the present invention to provide a novel two-piece swage type fastener for a fastened joint with a pin having a lock groove and ridges section with a plurality of lock grooves and with a collar adapted to be swaged into the lock groove section and having a flexible tab-like structure engageable with the lock grooves and allowing for the pin, collar and the joint to be held together, prior to swage, in a non-permanent pre-assembly.

It is another object of the present invention to provide a novel two-piece swage fastener of the type noted in the preceding object in which the tab-like structure on the collar is adapted to be deformed out of the lock grooves by a preselected axial load which is less than that at which collar deformation in swage is initiated.

It is another object of the present invention to provide a novel two-piece swage fastener of the type noted in which the tab-like structure is located at a position to minimize its affect on the lock between the collar and pin.

It is another general object of the present invention to provide a novel two-piece swage type fastener and a method of making same.

Other objects, features and advantages of the present invention will become apparent from the subsequent description and the appended claims, taken in conjunction with the accompanying drawings, in which:

Figure 1:
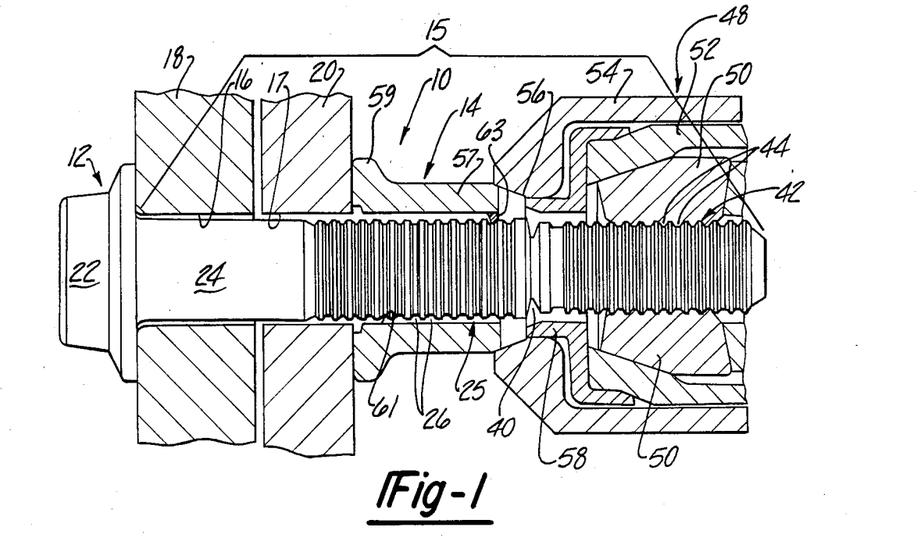
FIG. 1 is a longitudinal view with some portions shown in section and others shown broken away of a fastener, including a pin and a collar, of the present invention in assembly relationship with workpiece and with a portion of a tool shown as applied to the fastener prior to final installation.
Figure 2:
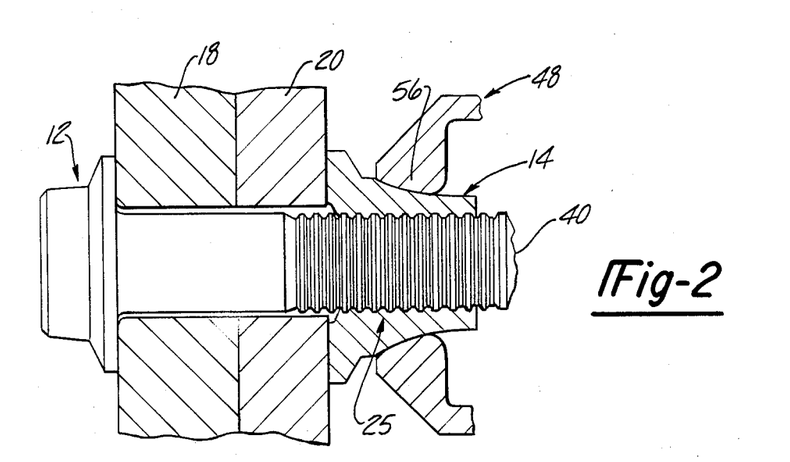
FIG. 2 is a view similar to that of FIG. 1 showing the fastener after it has been set.

Looking now to FIGS. 1 and 2, a fastener 10 is shown to include a pin member 12 and a tubular collar 14. Pin member 12 has an elongated shank 15 which extends through aligned openings 16 and 17 in a pair of workpieces 18 and 20, respectively, to be secured together. An enlarged protruding head 22 at one end of shank 15 engages one side of workpiece 18. Adjacent the head 22, the shank 15 has a straight portion 24 which is adapted to be received within aligned bores 16 and 17 with a clearance fit. Following the straight portion 24 is a lock groove portion 25 defined by a plurality of annular grooves 26.

A breakneck groove 50 is located between the lock groove portion 25 and a gripping or pull portion 42 and defines the weakest portion on the shank 15. The pull portion 42 is comprised of a plurality of annular pull grooves 44; the pull portion 42 is of a reduced diameter relative to the shank portion 24 and the lock groove portion 25. The pull grooves 44 are adapted to be gripped by a tool 48 which is actuable to set the fastener 10. The tool 48 can be generally constructed in a manner known to those skilled in the art and hence is only partially shown for purposes of simplicity. Briefly, the tool 48 has a plurality of jaws 50 having teeth adapted to grip the pin 12 at pull grooves 44. Jaws 50 are located in a tubular collet assembly 52 which is slidably supported in an anvil housing 54 which terminates at one end in a swage anvil portion 56.

The tubular collar 14 has a generally straight shank portion 57 terminating in an enlarged flange 59. The collar 14 has a generally smooth bore 61 of a diameter to be in clearance with the pin shank 15. A flexible tab-like structure 63 is secured to the collar 14 at its outer end (opposite flange 59) and extends radially inwardly sufficiently to engage the pin shank 15.

Figure 3:
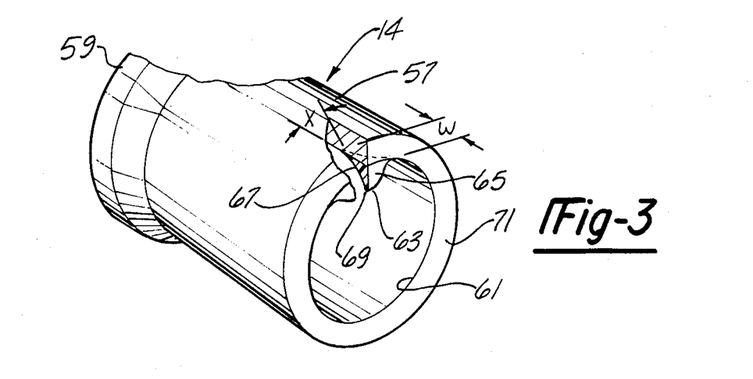
FIG. 3 is a fragmentary pictorial view of the collar of FIG. 1 depicting the tab-like retaining construction in its relaxed condition.

Looking now to FIG. 3, the tab 63, in its relaxed state is constructed to have a front face 65 which extends radially generally transversely or at right angles to the axis of the collar 14. The front face 65 is substantially flush with the outer collar surface 71 within around 0.010 inches. The tab 63 is generally wedge shaped and hence has a rear face 67 which extends rearwardly at an angle X of around 30° to around 60°. At the same time, the tab 63 tapers radially in circumferentially opposite directions from its radially innermost point or tip 69. The tab 63 is constructed of a flexible and readily deformable plastic material to permit it to accommodate the shapes of various mating or engaging surfaces.

In operation the pin 12 is located in the workpiece bores 16 and 17 and the collar 14 is located over the pin shank 15. The tab 63 extends radially inwardly sufficiently to engage the ridges of the lock grooves 26. The tab 63, however, being flexible can deform or bend over the ridges of the lock grooves 26 until the collar flange 59 engages the workpiece 20. As will be seen, the tapered or wedge like construction of the flexible tab 63 facilitates movement of the collar 14 onto the pin 12 but requires a significantly higher removal force. The latter is a result both of the configuration of the tab 63 and of the shape of the lock grooves 26. Note that, while the removal load of the tab 63 is considerably higher than its application load, in one form of the invention the collar 14 can still be removed and effectively reapplied again. The latter is advantageous in certain applications where assembly, disassembly and final assembly of workpieces is desired.

As noted, in some applications, it is advantageous to have the workpieces 18 and 20 lightly clamped or even loosely held together to permit an appropriate fit up of the associated structure prior to final installation. After the pin 12 and collar 14 have been pre-assembled as noted the installation tool 48 is applied to the fastener 10 and a relative axial force is applied between the pin 12 and collar 14 via the jaw assembly 50 gripping the pull groove portion 42 and the swage anvil 56 engaging the outer end of the collar 14. As the relative axial force increases, the flexible tab 63 will deform sufficiently to permit the collar 14 to move further axially relative to the pin 12. The workpieces 18 and 20 can now be clamped together at a preselected preload by the relative axial force initially applied between the pin 12 and collar 14 and, as the axial force increases, the collar 14 is swaged into the lock groove portion 25. As the axial force continues to increase, a magnitude will be attained at which the pin 12 will fracture at the breakneck groove 40 completing the setting operation (see FIG. 2). Subsequently, upon further actuation of the tool 48, a collar ejector member 58 will be urged forwardly to eject the swaged collar 14 from the anvil 56 thus completing the installation.

Note that the contour of the swage cavity of the anvil 56 and the contour of the outer end of the collar 14 are such that swaging of the collar 14 into the lock grooves 26 will not start to occur at the lower magnitude of relatively axial force required to deform, and in a sense to ratchet, the flexible tab 63 over the lock grooves 26 during pull up o the workpieces 18 and 20 at the initiation of the swage operation.

Figure 4:
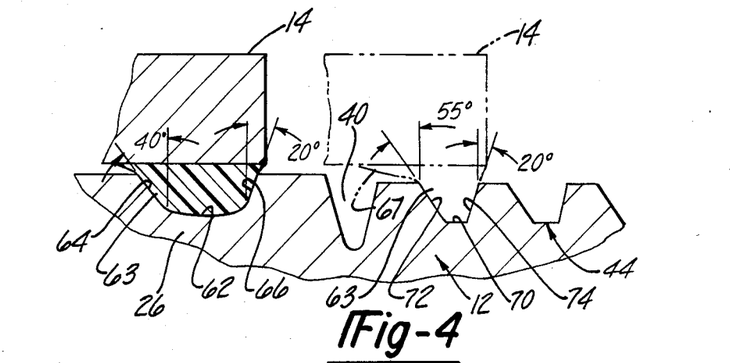
FIG. 4 is fragmentary view to enlarged scale of a portion of the pin of FIG. 1 depicting the tab-like retaining construction in a lock groove and, in phantom, in a pull groove of the pin.

The functioning of the flexible tab 63 with the lock grooves 26 of pin 12 can best be seen in FIG. 4. Each of the lock grooves 26 of FIG. 4 is of a generally shallow construction and has a leading transition portion 64 extending at a 40° angle with a plane transverse to the axis of pin 12; the trailing transition portion 66 extends at a steeper angle of 20°. The angle of the leading portion 64 facilitates flow of the material of collar 14 in swage while the steeper angled trailing portion 66 provides a buttressing effect relative to the swaged collar material. This buttressing effect facilitates clamping of the workpieces 18 and 20 as the collar 14 elongates during swage. The transition portions 64 and 66 tangentially intercept an arcuate or elliptical root portion 62 and define lock ridges axially therebetween.

The wedge shape of the flexible tab 63 complements the contour of the lock grooves 26. Thus the leading, angulated surface 67 of tab 63 cooperates with the leading groove surface 64 to facilitate movement of the collar 14 onto the lock groove section 25 of pin 12. On the other hand the transverse trailing section 65 of the flexible tab 63 cooperates with the steeper angled trailing surface 66 of the lock grooves 26 to resist removal of the collar 14 from the pin 12. The tab contour shown also generally facilitates bending of the tab 63 in movement on to the lock groove section 25 while resisting bending in the opposite direction for removal.

In one form, the tab 63 had a maximum axial width W which was equal to or slightly wider than the lock grooves 26. This assured a generally complete fill of the lock groove 26 by the material of the tab 63 over at least some portion of its circumference. This also provides sufficient excess material of the tab 63 in the event the tab 63 is initially partially located between grooves 26. Since the tab 63 extends only partially circumferentially the excess material in a local area can be readily accommodated since the material of the tab 63 is sufficiently flexible to be deformed into the shape of the confronting surface of the lock groove section 25 whether it be in line with a single groove 26 or partially located between lock grooves 26. The general fill of a lock groove 26 by the tab 63 can be seen in FIG. 4 where the deformed tab 63 is shown in phantom. Thus the volume of the tab 63 is generally to define a width when the tab 63 is deformed approximately equal to the width of a lock groove 26.

It may be that in certain conditions of workpieces 18 and 20, the pre-assembly of the pin 12 and collar 14 will not permit location of the tab 63 in line with one of the lock grooves 26. In one form of the invention the tab 63 is provided to have a radial length in excess of the distance of the inside collar bore 61 to the root 62 of a lock groove 26.

In some applications it may be desirable to permit pre-assembly by the engagement of the tab 63 with the pull grooves 44 (see FIG. 4). In this case the radial tab length is greater than the distance of the collar bore 61 to the root 70 of the pull grooves 44. Note that in order to facilitate movement of the gripping jaws 50 over the pull grooves 44, the grooves 44 have a leading surface 72 which extends at an angle of around 55° with a plane transverse to the axis of the pin 12. The trailing pull groove surface 74, however, is provided to have a steeper contour, i.e. 20°, to enhance the gripping engagement by a similarly contoured portion of the teeth in the gripping jaws 50. The surfaces 72 and 74 define pull ridges axially therebetween. Thus by providing the tab 63 to extend radially to at least the root 70 of the pull grooves 44, the collar 14 can be preassembled and retained to the pin 12 simply by the engagement of the tab 63 with the pull grooves 44. Again the noted contour of the pull grooves 44 facilitates movement of the collar 14 over the leading surfaces 72 of the pull grooves 44 while resisting removal against the steeper trailing surfaces 74. Of course, the retention force between the pin 12 and collar 14 will not be as significant as when the tab 63 engages the lock grooves 26. In FIG. 4 the engagement of the tab 63 with the pull grooves 44 is depicted in phantom.

While the pin 12 is shown to have lock grooves 26 of the shallow, streamlined contour shown, the collar 14 may be used with other pins having lock grooves of a different contour and can be annular or helical. One such different contour is shown in the multigrip type fastener of the Smith patent, supra.

Thus the use of a tab which extends for only a limited portion of the circumference of the associated lock groove permits the tab to be used with a variety of groove contours. The limited circumferential extent of the tab 63 permits any local, excess in volume of tab material to be deformed circumferentially. The latter facilitates manufacture since the same tab can be provided for the same collar albeit for different pins.

The fastener 10 shown and discussed above is a pull type fastener adapted to be finally installed by a conventional pull type tool 48. The features of the invention, however, are also applicable to a stump type fastener adapted to be finally installed by a squeeze type tool. Thus a stump type fastener is shown in FIG. 5 in which components similar to like components in the embodiment of FIGS. 1 and 2 have been given the same numeral designation with the addition of the letter postscript "a".

Figure 5:
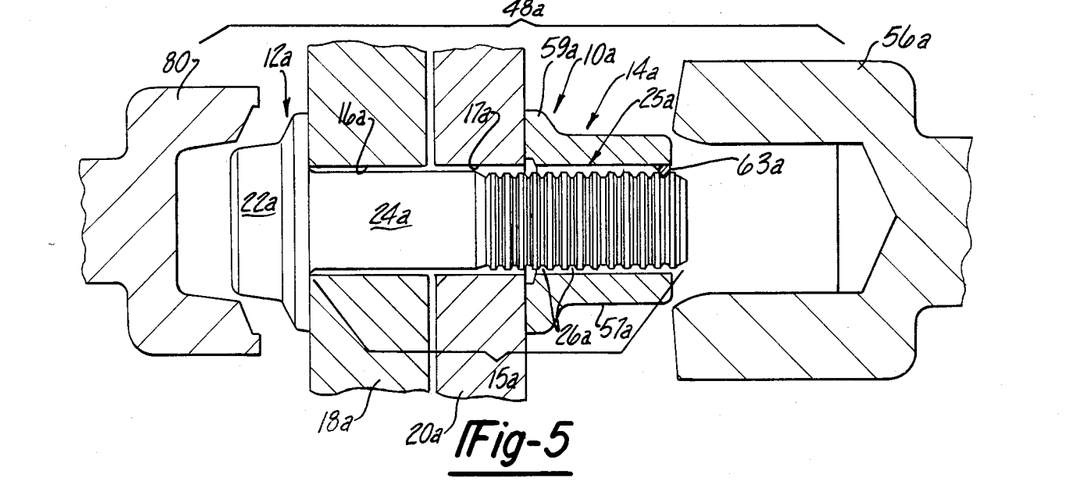
FIG. 5 is a view similar to that of FIG. 1 depicting a stump version of the fastener of FIG. 1.

Looking now to FIG. 5, a stump type fastener 10a is shown to include a pin member 12a and tubular collar 14a. Pin member 12a has an elongated shank 15a which extends through aligned openings 16a and 17a in a pair of workpieces 18a and 20a, respectively, to be secured together. An enlarged protruding head 22a at one end of shank 15a engages one side of workpiece 18a. Adjacent the head 22a, the shank 15a has a straight portion 24a which is adapted to be received within aligned bores 16a and 17a with a clearance fit. Following the straight portion 24a is a lock groove portion 25a defined by a plurality of annular grooves 26a.

The tubular collar 14a has a generally straight shank portion 57a terminating in an enlarged flange 59a. The collar 14a is identical to collar 14 and is provided with a flexible tab 63a.

In operation, the workpieces 18a and 20a and pin 12a and collar 14a are pre-assembled via the engagement of tab 63a in the lock grooves 26a. Next a squeeze type installation tool 48a is applied to the fastener 10a and a relative axial force is applied between the pin 12a and collar 14a via a swage anvil 56a engaging the outer end of the collar 14a and a reaction member 80 adapted to engage the pin head 22a. As the relative axial force increases the tab 63a will deform sufficiently to permit the collar 14a to move further axially to the pin 12a. The workpieces 18a and 20a will be clamped together at a preselected preload by the relative axial force initially applied between the pin 12a and collar 14a and, as the axial force increases, the collar 14a is swaged into the lock groove portion 25a completing the swaging operation.

Note that the contour of the swage cavity of the swage anvil 56a and the contour of the outer end of the collar 14a are such that swaging of the collar 14a into the lock grooves 26a will not start to occur at the lower magnitude of relative axial force required to deform the tab 63a over the lock grooves 26a at the initiation of the swage operation.

The tool 48a can be of a construction of a known type in which the swage anvil 56a and reaction member 80 are located in a generally "C" shaped housing with the anvil 56a and reaction member 80 being moved towards each other when the tool 48a is actuated to apply a relative axial force to squeeze the fastener located in between.

As noted the tab 63 is located at the outer end or top of the collar 14. This is to minimize the amount of lock groove volume that might be taken up by the significantly weaker tab material and hence to minimize any loss of strength of the lock between pin 12 and collar 14. By thus locating the tab 63, the material of the tab 63 will be least likely to be fully located in one of the lock grooves which is to receive the material of the collar in swage. At the same time, the tab material will be more readily able to extrude forwardly and out of the grooves since the front end of the collar 14 is open. Thus the location of the tab 63 at the front end rather than within the confines of collar 14 is desirable. At the same time the use of only a limited circumferential length of tab 63 minimizes the volume of tab 63 that might be located in a lock groove 26 in lieu of the harder collar material. Thus it is believed advantageous that the tab extend circumferentially for no more than between around 10% to around 25% of the collar circumference. Of course, more than one tab could be used.

Figure 8:
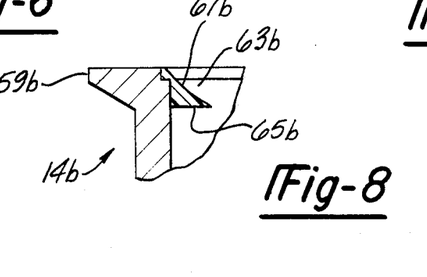
FIG. 8 is a fragmentary view depicting the retaining tab located at the flange end of the associated collar.

The tab, such as tab 63, could be located at the flange end of the collar 14, see FIG. 8. The collar in FIG. 8 is identical to that shown in FIG. 1 and 2 except for the location of the tab and hence the similar components and portions have been given the same numerical designation with the addition of letter postscript "b". In this case the collar 14b with tab 63b located at the outer end of flange 59b would have the added advantage of permitting the tab 63b to be closer to the lock groove section upon the initial pre-assembly. Hence a wider gap between workpieces could be accommodated by such a construction. Note that the tab 63b has the same contour as tab 63 with the leading surface 67b and trailing surface 65b angled to facilitate pin insertion and resist collar removal. By locating the tab 63b near the bottom of the collar 14b and generally in line with the flange 59b, the tab 63b will not engage lock grooves which are to be filled in swage. Even with collars without the flange 59b, the material of the collar near the sheet line is not normally completely swaged into a lock groove. Thus the tab 63b, as located, will generally not affect the strength of the finally swaged fastener.

Although a variety of materials would be suitable for the tab 63, a flexible urethane of about a Shore A70 to around a Shore A90 hardness was found satisfactory. Another suitable material for tab 63 is an ethylene copolymer such as ethylene vinyl acetate of about a Shore A70 to around a Shore A90 hardness.

Figure 6:
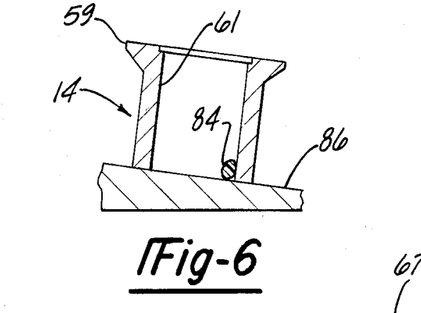
FIG. 6 is a sectional view showing one step in the method of forming the tab-like retaining structure and simultaneously securing it to the collar.
Figure 7:
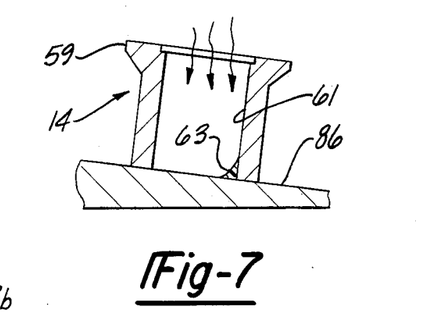
FIG. 7 is the final step in the method of FIG. 6.

The tab 63 can be formed and secured to the collar 14 by a simple technique as shown in FIGS. 6 and 7. Thus in FIG. 6 the collar 14 is provided to be clean and free of lubricant or other surface coating that might resist adhesion of the plastic material being used. Next a pellet 84 of the plastic material is located within the bore 61 of the collar 14. The collar 14 is supported on a surface 86 which is angulated slightly from the horizontal so that the pellet 84 will naturally move against the inside collar surface of bore 61. Next heat is applied to the pellet 84 to cause the pellet 84 to melt and undergo its chemical transformation to the desired plastic form. At the same time the melted pellet 84 flows against the surface of collar bore 61 to assume the desired final shape of the tab 63. Upon cooling, the tab 63 has been formed to the desired shape and is secured to the collar 14. Thus the tab 63 can be formed to a desired shape and at the same time be bonded to the collar 14 in a simple procedure. Of course the volume of the pellet 84 will be selected to yield the desired volume and radial extent of the tab 63. Note also that by the use of adhesion, as shown, the shape and volume of the collar 14 can be maintained in its conventional form without the need for retaining grooves etc.

Thus in the present invention, a simple but effective structure is provided to permit a rapid pre-assembly of workpieces with a swage type fastener. The fastener structure permits subsequent disassembly prior to final installation and ultimately provides the advantages inherent in a swage type system.

While it will be apparent that the preferred embodiments of the invention disclosed are well calculated to fulfill the objects above stated, it will be appreciated that the invention is susceptible to modification, variation and change without departing from the proper scope or fair meaning of the invention.

What is claimed is:

1. In a fastening system including a fastener for securing workpieces together in a pre-assembly with said fastener adapted to be finally installed via a relative axial force applied by a pull tool, said fastener comprising:

a pin member having an elongated shank terminating at one end in an enlarged pin head, said shank including a pull portion located at the opposite end from said pin head, said shank including a lock portion having a plurality of circumferentially extending lock grooves and lock ridges located on said shank between said pin head and said pull portion, each of said lock grooves having a leading side surface and a trailing side surface with said leading side surface angulated towards said pin head at an acute angle relative to a plane transverse to the pin axis greater than the similar angulation of said trailing side surface away from said pin head, a breakneck groove defining the weakest portion of said pin shank and located between said pull portion and said lock grooves, a tubular collar adapted to be located on said pin shank and to be swaged into said lock grooves in response to a first preselected magnitude of said relative axial force applicable by the pull tool, said collar having a through bore of a diameter to generally receive said pull portion and said lock portion in clearance relationship, said collar having a single tab formed at the extremity of one end of said collar and extending radially inwardly relative to said through bore and adapted to engage said lock grooves, said tab being a member separate from said collar and secured to said collar at said one end by adhesion, said tab being constructed of a flexible readily deformable material and extending circumferentially no greater than around 25% of the circumference of said collar, said tab having a deformed width when located in said lock grooves at least equal to around the width of said lock grooves, said tab having a generally tapered structure being substantially wider adjacent said collar and narrower at its radial inner extremity, said tab having a leading surface angulated from said one end of said collar towards the opposite end of said collar, said tab having a trailing surface extending generally in quadrature with the axis of said collar, said leading and trailing tab surfaces being angulated to cooperate with said leading and trailing side surfaces of said lock grooves to facilitate assembly of said collar over said lock grooves and to resist at a substantially higher load the removal of said collar from said lock grooves, said pull portion being of a diameter less than said lock grooves and including a plurality of pull grooves and pull ridges, each of said pull grooves having a leading and a trailing flank surface with said leading flank surface angulated towards said pin head at an acute angle relative to a plane transverse to the pin axis greater than the similar angulation of said trailing flank surface away from said pin head, said tab extending radially inwardly sufficiently to engage said pull grooves, said leading and trailing tab surfaces being angulated to cooperate with said leading and trailing flank surfaces of said pull grooves to facilitate assembly of said collar over said pull grooves and to resist at a substantially higher load the removal of said collar from said pull grooves, said single tab having its flexibility and circumferential extent selected to permit removal of said collar form said lock grooves and/or said pull grooves at said substantially higher loads and to permit reapplication of said collar to said pin member to engage said lock grooves and/or said pull grooves for again securing the workpieces together with the desired pre-assembly, said tab being constructed of said flexible readily deformable material permitting said tab to substantially deform into the shape of the confronting surface of said lock grooves and lock ridges and/or said pull grooves and pull ridges, said tab having a preselected strength selected to deform out of said lock grooves in response to a second preselected magnitude of relative axial force applied between said pin and said collar by the pull tool with said second preselected magnitude being less than said first preselected magnitude.

2. In a fastening system including a fastener for securing workpieces together in a pre-assembly with said fastener adapted to be finally installed via a relative axial force applied by a pull tool, said fastener comprising:

a pin member having an elongated shank terminating at one end in an enlarged pin head, said shank including a pull portion located at the opposite end from said pin head, said shank including a lock portion having a plurality of circumferentially extending lock grooves and lock ridges located on said shank between said pin head and said pull portion, each of said lock grooves having a leading side surface and a trailing side surface, a breakneck groove defining the weakest portion of said pin shank and located between said pull portion and said lock grooves, a tubular collar adapted to be located on said pin shank and to be swaged into said lock grooves in response to a first preselected magnitude of said relative axial force applicable by the pull tool, said collar having a through bore of a diameter to generally receive said pull portion and said lock portion in clearance relationship, said collar having a single tab formed at the extremity of one end of said collar and extending radially inwardly relative to said through bore and adapted to engage said lock grooves, said tab being a member separate from said collar and secured to said collar at said one end by adhesion, said tab being constructed of a flexible readily deformable material and extending for substantially less than the full circumference of said collar, said tab having a deformed width when located in said lock grooves at least equal to around the width of said lock grooves, said tab having a leading surface and a trailing surface, said leading and trailing tab surfaces being angulated to cooperate with said leading and trailing side surfaces of said lock grooves to facilitate assembly of said collar over said lock grooves and to resist at a substantially higher load the removal of said collar from said lock grooves, said pull portion being of a diameter less than said lock grooves and including a plurality of pull grooves and pull ridges, each of said pull grooves having a leading and a trailing flank surface, said tab extending radially inwardly sufficiently to engage said pull grooves, said leading and trailing tab surfaces cooperating with said leading and trailing flank surfaces of said pull grooves to facilitate assembly of said collar over said pull grooves and to resist at a substantially higher load the removal of said collar from said pull grooves, said single tab having its flexibility and circumferential extent selected to permit removal of said collar from said lock grooves and/or said pull grooves at said substantially higher loads and to permit reapplication of said collar to said pin member to engage said lock grooves and/or said pull grooves for again securing the workpieces together with the desired pre-assembly, said tab being constructed of said flexible readily deformable material permitting said tab to substantially deform into the shape of the confronting surface of said lock grooves and lock ridges and/or said pull grooves and pull ridges, said tab having a preselected strength selected to deform out of said lock grooves in response to a second preselected magnitude of relative axial force applied between said pin and said collar by the pull tool with said second preselected magnitude being less than said first preselected magnitude.

3. In a fastening system including a fastener for securing workpieces together in a pre-assembly with said fastener adapted to be finally installed via a relative axial force by a tool, said fastener comprising:

a pin member having an elongated shank terminating at one end in an enlarged pin head, said shank including a lock portion having a plurality of circumferentially extending lock grooves and lock ridges, each of said lock grooves having a leading side surface and a trailing side surface with said leading side surface angulated towards said pin at an angle greater than the angulation of said trailing side surface away from said pin head, a tubular collar adapted to be located on said pin shank and to be swaged into said lock grooves in response to a first preselected magnitude of said relative axial force applicable by the tool, said collar having a through bore of a diameter to generally receive said lock portion in clearance relationship, said collar having a single tab formed at the extremity of one end of sad collar and extending radially inwardly relative to said through bore and adapted to engage said lock grooves, said tab being a member separate from said collar and secured to said collar at said one end by adhesion, said tab being constructed of a flexible readily deformable material and extending circumferentially no greater than around 25% of the circumference of said collar, said tab having a deformed width when located in said lock grooves at least equal to around the width of said lock grooves, said tab having a generally tapered structure being substantially wider adjacent said collar and narrower at its radially inner extremity, said tab having a leading surface angulated from said one end of said collar towards the opposite end of said collar, said tab having a trailing surface extending generally in quadrature with the axis of said collar, said leading and trailing tab surfaces cooperating with said leading and trailing side surfaces of said lock grooves to facilitate assembly of said collar over said lock grooves and to resist at a substantially higher load the removal of said collar from said lock grooves, said single tab having its flexibility and circumferential extent selected to permit removal of said collar from said lock grooves at said substantially higher load and to permit reapplication of said collar to said pin member to engage said lock grooves for again securing the workpieces together with the desired pre-assembly, said tab being constructed of said flexible readily deformable material permitting said tab to substantially deform into the shape of the confronting surface of said lock grooves and lock ridges, said tab having a preselected strength selected to deform out of said lock grooves in response to a second preselected magnitude of relative axial force applied between said pin and said collar by the tool with said second preselected magnitude being less than said first preselected magnitude.

4. In a fastening system including a fastener for securing workpieces together in a pre-assembly with said fastener adapted to be finally installed via a relative axial force applied by a tool, said fastener comprising:

a pin member having an elongated shank terminating at one end in an enlarged pin head, said shank including a lock portion having a plurality of circumferentially extending lock grooves and lock ridges, each of said lock grooves having a leading side surface and a trailing side surface, a tubular collar adapted to be located on said pin shank and to be swaged into said lock grooves in response to a first preselected magnitude of said relative axial force applicable by the tool, said collar having a through bore of a diameter to generally receive said lock portion in clearance relationship, said collar having a single tab formed at the extremity of one end of said collar and extending radially inwardly relative to said through bore and adapted to engage said lock grooves, said tab being a member separate from said collar and secured to said collar at said one end by adhesion, said tab being constructed of a flexible readily deformable material and extending for substantially less than the full circumference of said collar, said tab having a deformed width when located in said lock grooves at least equal to around the width of said lock grooves, said tab having a leading surface and a trailing surface, said leading and trailing tab surfaces cooperating with said leading and trailing side surfaces of said lock grooves to facilitate assembly of said collar over said lock grooves and to resist at a substantially higher load the removal of said collar from said lock grooves, said single tab having its flexibility and circumferential extend selected to permit removal of said collar from said lock grooves at said substantially higher load and to permit reapplication of said collar to said pin member to engage said lock grooves for again securing the workpieces together with the desired pre-assembly, said tab being constructed of said flexible readily deformable material permitting said tab to substantially deform into the shape of the confronting surface of said lock grooves and lock ridges, said tab having a preselected strength selected to deform out of said lock grooves in response to a second preselected magnitude of relative axial force applied between said pin and said collar by the tool with said second preselected magnitude being less than said first preselected magnitude.

5. In a fastening system including a fastener for securing workpieces together in a pre-assembly with said fastener adapted to be finally installed via a relative axial force applied by a tool, said fastener comprising:

a pin member having an elongated shank terminating at one end in an enlarged pin head, said shank including a lock portion having a plurality of circumferentially extending lock grooves and lock ridges, each of said lock grooves having a leading side surface and a trailing side surface, a tubular collar adapted to be located on said pin shank and to be swaged into said lock grooves in response to a first preselected magnitude of said relative axial force applicable by the tool, said collar having a through bore of a diameter to generally receive said lock portion in clearance relationship, collar retaining means formed at the extremity of one end of said collar and extending radially inwardly relative to said through bore and adapted to engage said lock grooves, said retaining means being constructed of a flexible readily deformable material to generally deform to the contour of said lock grooves when located therein, said retaining means having a leading surface and a trailing surface to define a contour cooperating with said leading and trailing side surfaces of said lock grooves to facilitate assembly of said collar over said lock grooves and to resist at a substantially higher load the removal of said collar from said lock grooves, said retaining means having a preselected strength selected to deform out of said lock grooves in response to a second preselected magnitude of relative axial force applied between said pin and said collar by the tool with said second preselected magnitude being less than said first preselected magnitude, said retaining means located at said extremity of said one end of said collar whereby the amount of fill of said lock grooves by said collar in swage is substantially unaffected, said retaining means having a deformed width when located in said lock grooves at least equal to around the width of said lock grooves, said retaining means comprising a single tab extending for substantially less than the full circumference of said collar, said single tab having its flexibility and circumferential extent selected to permit removal of said collar from said lock grooves at said substantially higher load and to permit reapplication of said collar to said pin member to engage said lock grooves for again securing the workpieces together with the desire pre-assembly, said tab being constructed of said flexible readily deformable material permitting said tab to substantially deform into the shape of the confronting surface of said lock grooves and lock ridges.

6. The system of claim 5 with said leading surface extending at an angle of between 30° to around 60° with a plane transverse to the collar axis.

7. The system of claim 5 with said leading surface extending at an angle of between 30° to around 60° with the surface of said collar bore and with said trailing surface extending generally in quadrature to said collar bore surface.

8. The system of claim 5 with said leading surface extending at an angle of between 30° to about 60° with the surface of said collar bore and with said trailing surface extending generally in quadrature to said collar bore surface, said retaining means extending circumferentially for no greater than around 25% of the circumference of said collar.

9. The system of claim 5 with said retaining means comprising a retaining member extending circumferentially for no greater than around 25% of the circumference of said collar.

10. The system of claim 5 with said retaining means formed from a plastic material having about a Shore A70 to around a Shore A90 hardness.

11. In a fastening system including a fastener for securing workpieces together in a pre-assembly with said fastener adapted to be finally installed via a relative axial force applied by a tool, said fastener comprising:

a pin member having an elongated shank terminating at one end in an enlarged pin head, said shank including a lock portion having a plurality of circumferentially extending lock grooves and lock ridges, each of said lock grooves having a leading side surface and a trailing side surface, a tubular collar adapted to be located on said pin shank and to be swaged into said lock grooves in response to a first preselected magnitude of said relative axial force applicable by the tool, said collar having a through bore of a diameter to generally receive said lock portion in clearance relationship, collar retaining means formed at the extremity of one end of said collar and extending radially inwardly relative to said through bore and adapted to engage said lock grooves, said retaining means being constructed of a flexible readily deformable material to generally deform to the contour of said lock grooves when located therein, said retaining means having a leading surface and a trailing surface to define a contour cooperating with said leading and trailing side surfaces of said lock grooves to facilitate assembly of said collar over said lock grooves and to resist at a substantially higher load the removal of said collar from said lock grooves, said retaining means having a preselected strength selected to deform out of said lock grooves in response to a second preselected magnitude of relative axial force applied between said pin and said collar by the tool with said second preselected magnitude being less than said first preselected magnitude, said retaining means located at said extremity of said one end of said collar whereby the amount of fill of said lock grooves by said collar is substantially unaffected, said retaining means having a deformed width when located in said lock grooves at least equal to around the width of said lock grooves, said leading surface on said retaining means extending at an angle of between 30° to around 60° with the surface of said collar bore and with said trailing surface extending generally in quadrature to said collar bore surface, said retaining means comprising a single tab like structure extending circumferentially for no greater than around 25% of the circumference of said collar, said single tab having its flexibility and circumferential extend selected to permit removal of said collar from said lock grooves at said substantially higher load and reapplication of said collar to said pin member to engage said lock grooves for again securing the workpieces together with the desire pre-assembly, said tab being constructed of said flexible readily deformable material permitting said tab to substantially deform into the shape of the confronting surface of said lock grooves and lock ridges.

12. In a fastening system including a fastener for securing workpieces together in a pre-assembly with said fastener adapted to be finally installed via a relative axial force applied by a tool, said fastener comprising a pin member having an elongated shank terminating at one end in an enlarged pin head, said shank including a lock portion having a plurality of circumferentially extending lock grooves and lock ridges, a tubular collar adapted to be located on said pin shank and to be swaged into said lock grooves in response to a first preselected magnitude of said relative axial force applicable by the tool, said collar having a single tab formed at the extremity of one end of said collar and extending radially inwardly and adapted to engage said lock grooves and to secure the workpieces together in the pre-assembly, said collar being made by the steps of: providing a through bore in said collar of a diameter to generally receive said lock portion in clearance relationship, providing a said single circumferentially limited tab at the extremity of one end of said collar with said tab extending radially inwardly relative to said through bore and formed to engage said lock grooves, said tab being formed to said collar by providing said collar to be clean on at least said one end, locating a pellet of plastic material within said collar bore and at said one end, supporting said pellet on an incline relative to said collar bore whereby said pellet will be moved to only one side of said collar bore, and applying heat to said pellet to cause it to melt and to form said tab adhering to said collar at said one end, said plastic material forming said tab to be of a flexible readily deformable construction extending circumferentially no greater than around 25% of the circumference of said collar and permitting said tab to substantially deform into the shape of the confronting surface of said lock grooves and lock ridges.

13. In a fastening system including a fastener for securing workpieces together in a pre-assembly with said fastener adapted to be finally installed via a relative axial force applied by a tool, said fastener comprising:

a pin member having an elongated shank terminating at one end in an enlarged pin head, said shank including a lock portion having a plurality of circumferentially extending lock grooves and lock ridges, each of said lock grooves having a leading side surface and a trailing side surface, a tubular collar adapted to be located on said pin shank and to be swaged into said lock grooves in response to a first preselected magnitude of said relative axial force applicable by the tool, said collar having a through bore of a diameter to generally receive said lock portion in clearance relationship, collar retaining means formed at the extremity of one end of said collar and extending radially inwardly relative to said through bore and adapted to engage said lock grooves, said retaining means being constructed of a flexible readily deformable material to generally deform to the contour of said lock grooves when located therein, said retaining means defining a contour cooperating with said leading and trailing side surfaces of said lock grooves to facilitate assembly of said collar over said lock grooves and to resist at a higher load the removal of said collar from said lock grooves, said retaining means having a preselected strength selected to deform out of said lock grooves in response to a second preselected magnitude of relative axial force applied between said pin and said collar by the tool with said second preselected magnitude being less than said first preselected magnitude, said retaining means located at said extremity of said one end of said collar whereby the amount of fill of said lock grooves by said collar in swage is substantially unaffected, said retaining means having a deformed width when located in said lock grooves generally at least around the width of said lock grooves, said retaining means comprising a tab extending for less than the full circumference of said collar, said tab having its flexibility and circumferential extent selected to permit removal of said collar from said lock grooves at said higher load and to permit reapplication of said collar to said pin member to engage said lock grooves for again securing the workpieces together with the desired pre-assembly, said tab being constructed of said flexible readily deformable material permitting said tab to substantially deform into the shape of the confronting surface of said lock grooves and lock ridges.

14. In a fastening system including a fastener for securing workpieces together in a pre-assembly with said fastener adapted to be finally installed via a relative axial force applied by a tool, said fastener comprising:

a pin member having an elongated shank terminating at one end in an enlarged pin head, said shank including a lock portion having a plurality of circumferentially extending lock grooves and lock ridges, each of said lock grooves having a leading side surface and a trailing side surface, a tubular collar adapted to be located on said pin shank and to be swaged into said lock grooves in response to a first preselected magnitude of said relative axial force applicable by the tool, said collar having a through bore of a diameter to generally receive said lock portion in clearance relationship, collar retaining means formed at the extremity of one end of said collar and extending radially inwardly relative to said through bore and adapted to engage said lock grooves, said retaining means being constructed of a flexible readily deformable material to generally deform to the contour of said lock grooves when located therein, said retaining means defining a contour cooperating with said leading and trailing side surfaces of said lock grooves to facilitate assembly of said collar over said lock grooves and to resist at a higher load the removal of said collar from said lock grooves, said retaining means having a preselected strength selected to deform out of said lock grooves in response to a second preselected magnitude of relative axial force applied between said pin and said collar by the tool with said second preselected magnitude being less than said first preselected magnitude, said retaining means located at said extremity of said one end of said collar whereby the amount of fill of said lock grooves by said collar in swage is substantially unaffected, said retaining means having a deformed width when located in said lock grooves generally at least around the width of said lock grooves, said retaining means extending for less than the full circumference of said collar, said retaining means having its flexibility and circumferential extend selected to permit removal of said collar from said lock grooves at said higher load and to permit reapplication of said collar to said pin member to engage said lock grooves for again securing the workpieces together with the desired pre-assembly, said retaining means being constructed of said flexible readily deformable material permitting said retaining means to substantially deform into the shape of the confronting surface of said lock grooves and lock ridges.

15. In a fastening system including a fastener for securing workpieces together in a pre-assembly with said fastener adapted to be finally installed via a relative axial force applied by a tool, said fastener comprising:

a pin member having an elongated shank terminating at one end in an enlarged pin head, said shank including a lock portion having a plurality of circumferentially extending lock grooves and lock ridges, each of said lock grooves having a leading side surface and a trailing side surface, a tubular collar adapted to be located on said pin shank and to be swaged into said lock grooves in response to a first preselected magnitude of said relative axial force applicable by the tool, said collar having a through bore of a diameter to generally receive said lock portion in clearance relationship, collar retaining means formed at the extremity of one end of said collar and extending radially inwardly relative to said through bore and adapted to engage said lock grooves, said retaining means being constructed of a flexible readily deformable material to generally deform to the contour of said lock grooves when located therein, said retaining means defining a contour cooperating with said leading and trailing side surfaces of said lock grooves to facilitate assembly of said collar over said lock grooves and to resist at a higher load the removal of said collar from said lock grooves, said retaining means having a preselected strength selected to deform out of said lock grooves in response to a second preselected magnitude of relative axial force applied between said pin and said collar by the tool with said second preselected magnitude being less than said first preselected magnitude, said retaining means located at said extremity of said one end of said collar whereby the amount of fill of said lock grooves by said collar in swage is substantially unaffected, said retaining means having a deformed width when located in said lock grooves generally at least around the width of said lock grooves, said retaining means extending circumferentially of said collar, said retaining means having its flexibility and circumferential extent selected to permit removal of said collar from said lock grooves at said higher load and to permit reapplication of said collar to said pin member to engage said lock grooves for again securing the workpieces together with the desired pre-assembly, said retaining means being constructed of said flexible readily deformable material permitting said retaining means to substantially deform into the shape of the confronting surface of said lock grooves and lock ridges.

16. In a fastening system including a fastener for securing workpieces together in a pre-assembly with said fastener adapted to be finally installed via a relative axial force applied by a tool, said fastener comprising:

a pin member having an elongated shank terminating at one end in an enlarged pin head, said shank including a lock portion having a plurality of circumferentially extending lock grooves and lock ridges, each of said lock grooves having a leading side surface and a trailing side surface, a tubular collar adapted to be located on said pin shank and to be swaged into said lock grooves in response to a first preselected magnitude of said relative axial force applicable by the tool, said collar having a through bore of a diameter to generally receive said lock portion in clearance relationship, collar retaining means formed at the extremity of one end of said collar and extending radially inwardly relative to said through bore and adapted to engage said lock grooves, said retaining means being constructed of a flexible readily deformable material to generally deform to the contour of said lock grooves when located therein, said retaining means defining a contour cooperating with said leading and trailing side surfaces of said lock grooves to facilitate assembly of said collar over said lock grooves and to resist at a preselected magnitude of higher load the removal of said collar from said lock grooves, said retaining means having a preselected strength selected to deform out of said lock grooves in response to a second preselected magnitude of relative axial force applied between said pin and said collar by the tool with said second preselected magnitude being less than said first preselected magnitude, said retaining means located at said extremity of said one end of said collar whereby the amount of fill of said lock grooves by said collar in swage is substantially unaffected.

said retaining means having a deformed width when located in said lock grooves equal to around the width of said lock grooves, said retaining means comprising a tab extending for less than the full circumference of said collar, said tab being constructed of said flexible readily deformable material permitting said tab to substantially deform into the shape of the confronting surface of said lock grooves and lock ridges.

17. In a fastening system including a fastener for securing workpieces together in a pre-assembly with said fastener adapted to be finally installed via a relative axial force applied by a tool, said fastener comprising:

a pin member having an elongated shank terminating at one end in an enlarge pin head, said shank including a lock portion having a plurality of circumferentially extending lock grooves and lock ridges, each of said lock grooves having a leading side surface and a trailing side surface, a tubular collar adapted to be located on said pin shank and to be swaged into said lock grooves in response to a first preselected magnitude of said relative axial force applicable by the tool, said cool having a through bore of a diameter to generally receive said lock portion in clearance relationship, collar retaining means formed at the extremity of one end of said collar and extending radially inwardly relative to said through bore and adapted to engage said lock grooves, said retaining means being constructed of a flexible readily deformable material to generally deform to the contour of said lock grooves when located therein, said retaining means defining a contour cooperating with said leading and trailing side surfaces of said lock grooves to facilitate assembly of said collar over said lock grooves and to resist at a preselected magnitude of load the removal of said collar from said lock grooves, said retaining means having a preselected strength selected to deform out of said lock grooves in response to a second preselected magnitude of relative axial force applied between said pin and said collar by the tool with said second preselected magnitude being less than said first preselected magnitude, said retaining means located at said extremity of said one end of said collar whereby the amount of fill of said lock grooves by said collar in swage is substantially unaffected, said retaining means having a deformed width when located in said lock grooves generally at least around the width of said lock grooves, said retaining means extending for less than the full circumference of said collar, said retaining means being constructed of said flexible readily deformable material permitting said retaining means to substantially deform into the shape of the confronting surface of said lock grooves and lock ridges.

18. In a fastening system including a fastener for securing workpieces together in a pre-assembly with said fastener adapted to be finally installed via a relative axial force applied by a tool, said fastener comprising:

a pin member having an elongated shank terminating at one end in an enlarged pin head, said shank including a lock portion having a plurality of circumferentially extending lock grooves and lock ridges, each of said lock grooves having a leading side surface and a trailing side surface, a tubular collar adapted to be located on said pin shank and to be swaged into said lock grooves in response to a first preselected magnitude of said relative axial force applicable by the tool, said collar having a through bore of a diameter to generally receive said lock portion in clearance relationship, collar retaining means formed at the extremity of one end of said collar and extending radially inwardly relative to said through bore and adapted to engage said lock grooves, said retaining means being constructed of a flexible readily deformable material to generally deform to the contour of said lock grooves when located therein, said retaining means defining a contour cooperating with said leading and trailing side surfaces of said lock grooves to facilitate assembly of said collar over said lock grooves and to resist at a preselected magnitude of load the removal of said collar from said lock grooves, said retaining means having a preselected strength selected to deform out of said lock grooves in response to a second reselected magnitude of relative axial force applied between said pin and said collar by the tool with said second preselected magnitude being less than said first preselected magnitude, said retaining means located at said extremity of said one end of said collar whereby the amount of fill of said lock grooves by said collar in swage is substantially unaffected.

said retaining means having a deformed width when located in said lock grooves generally at least around the width of said lock grooves, said retaining means extending circumferentially of said collar, said retaining means being constructed of said flexible readily deformable material permitting said retaining means to substantially deform into the shape of the confronting surface of said lock grooves and lock ridges.

19. In a fastening system including a fastener for securing workpieces together in a pre-assembly with said fastener adapted to be finally installed via a relative axial force applied by a tool, said fastener comprising a pin member having an elongated shank terminating at one end in an enlarged pin head, said shank including a lock portion having a plurality of circumferentially extending lock grooves and lock ridges, a tubular collar adapted to be located on said pin shank and to be swaged into said lock grooves in response to a first preselected magnitude of said relative axis force applicable by the tool, said collar having a circumferentially limited tab formed at the extremity of one end of said collar and extending radially inwardly and adapted to engage said lock grooves and to secure the workpieces together in the pre-assembly, said collar being made by the steps of: providing a through bore in said collar of a diameter to generally receive said lock portion in clearance relationship, providing said circumferentially limited tab at said extremity of one end of said collar with said tab extending radially inwardly relative to said through bore and formed to engage said lock grooves, said tab being formed to said collar by providing said collar to be clean on at least said one end, locating a pellet of plastic material within said collar bore and at said one end, supporting said pellet on an incline relative to said collar bore whereby said pellet will be moved to only one side of said collar bore, and applying heat to said pellet to cause it to melt and to form said tab adhering to said collar at said one end, said plastic material forming said tab to be of a flexible readily deformable construction extending circumferentially less than the circumference of said collar and permitting said tab to substantially deform into the shape of the confronting surface of said lock grooves and lock ridges.

* * * * *

UNITED STATES PATENT AND TRADEMARK OFFICE
CERTIFICATE OF CORRECTION

PATENT NO. : 4,813,834

DATED : March 21, 1989

INVENTOR(S) : Walter J. Smith

It is certified that error appears in the above-identified patent and that said Letters Patent is hereby corrected as shown below:

In the Title delete "AND METHOD OF MAKING SAME"
Col. 3, line 28, delete "50" and substitute therefor --40--
Col. 4, line 44, delete "o" and substitute therefore --of--
Col. 9, line 12, Claim 1, delete "form" and substitute therefor --from--
Col. 10, line 58, Claim 3, delete "sad" and substitute therefor --said--
Col. 13, line 12, Claim 8, delete "about" and substitute therefor --around--

Col. 14, line 37, Claim 12, delete "a"

Col. 18, line 6, Claim 17, delete "enlarge" and substitute therefor --enlarged--
Col. 18, line 15, Claim 17, delete "cool" and substitute therefor --collar--
Col. 19, line 16, Claim 18, delete "reselected" and substitute therefor --preselected--
Col. 20, line 9, Claim 19, delete "axis" and substitute therefor --axial--

Signed and Sealed this

Seventeenth Day of April, 1990

Attest:

HARRY F. MANBECK, JR.

*Attesting Officer*     *Commissioner of Patents and Trademarks*